(12) United States Patent
Erhel et al.

(10) Patent No.: US 10,822,091 B2
(45) Date of Patent: Nov. 3, 2020

(54) PASSENGER SEAT FOR AIRCRAFT

(71) Applicant: BOMBARDIER INC., Dorval (CA)

(72) Inventors: Philippe Erhel, Montréal (CA);
Jerome Vigeant, Montréal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/293,740

(22) Filed: Mar. 6, 2019

(65) Prior Publication Data
US 2019/0276152 A1    Sep. 12, 2019

Related U.S. Application Data

(60) Provisional application No. 62/639,202, filed on Mar. 6, 2018.

(51) Int. Cl.
| | | |
|---|---|---|
| *B60N 2/10* | (2006.01) | |
| *B60N 2/42* | (2006.01) | |
| *B60N 2/427* | (2006.01) | |
| *B64D 11/06* | (2006.01) | |
| *B60N 2/18* | (2006.01) | |

(Continued)

(52) U.S. Cl.
CPC .............. *B64D 11/064* (2014.12); *B60N 2/06* (2013.01); *B60N 2/062* (2013.01); *B60N 2/0717* (2013.01); *B60N 2/14* (2013.01); *B60N 2/181* (2013.01); *B60N 2/1835* (2013.01); *B60N 2/1878* (2013.01); *B60N 2/231* (2013.01); *B60N 2/42736* (2013.01); *B64D 11/0619* (2014.12); *B64D 11/0648* (2014.12); *B64D 11/0696* (2013.01)

(58) Field of Classification Search
CPC ... B64D 11/06; B64D 11/0619; B64D 11/062; B64D 11/064; B64D 11/0648; B64D 11/0696; B60N 2/0717; B60N 2/14; B60N 2/181; B60N 2/1835; B60N 2/1878; B60N 2/231; B60N 2/42736
USPC .............. 297/216.1, 216.15, 216.17, 217.18, 297/216.19, 216.2, 316, 322, 341, 342, 297/314
See application file for complete search history.

(56) References Cited

U.S. PATENT DOCUMENTS 3,582,133 A * 6/1971 DeLavenne .............. B60N 2/10
297/216.1 X
4,911,381 A * 3/1990 Cannon .............. B64D 11/0696
297/216.2 X (Continued)

*Primary Examiner* — Rodney B White
(74) *Attorney, Agent, or Firm* — Norton Rose Fulbright Canada LLP

(57) ABSTRACT

A passenger seat for an aircraft has a fixed seat portion with a front facing toward a first direction of the aircraft. The fixed seat portion has a centerline spaced equally from opposed lateral sides of the fixed seat portion. A first engagement member extends upwardly from the front at the centerline to a first engagement end. A moveable seat portion is mounted onto the fixed seat portion and is displaceable relative thereto. The moveable seat portion has a second engagement member extending downwardly from a front of the moveable seat portion to a second engagement end. The second engagement member is displaceable with the moveable seat portion to position the second engagement end under the first engagement end in an engagement position such that the overlapping first and second engagement ends prevent the moveable seat portion from pitching in a second direction opposite to the first direction.

20 Claims, 5 Drawing Sheets

(51) Int. Cl.
  *B60N 2/23* (2006.01)
  *B60N 2/14* (2006.01)
  *B60N 2/06* (2006.01)
  *B60N 2/07* (2006.01)

(56) References Cited

U.S. PATENT DOCUMENTS

| | | | |
|---|---|---|---|
| 5,568,960 A | 10/1996 | Oleson et al. | |
| 5,622,405 A | 4/1997 | Pitencel | |
| 5,676,336 A * | 10/1997 | Nefy | B64D 25/04 297/216.17 X |
| 6,511,130 B2 | 1/2003 | Dinkel et al. | |
| 6,648,409 B1 * | 11/2003 | Laporte | B60N 2/4221 297/216.1 |
| 6,769,739 B2 * | 8/2004 | Salzer | B60N 2/34 297/342 X |
| 7,731,281 B2 * | 6/2010 | Kurita | B60N 2/015 297/216.19 X |
| 7,997,654 B2 * | 8/2011 | Ferry | B60N 2/206 297/342 |
| 8,292,221 B2 | 10/2012 | Kennedy et al. | |
| 8,342,606 B2 | 1/2013 | Le Texier et al. | |
| 8,376,458 B2 * | 2/2013 | Meister | B64D 11/06 297/341 X |
| 8,419,123 B2 * | 4/2013 | Hankinson | B64D 11/06 297/342 X |
| 8,439,435 B2 * | 5/2013 | Gaither | B60N 2/242 297/342 X |
| 8,616,637 B2 * | 12/2013 | Trimble | B64D 11/0696 297/216.15 X |
| 8,641,140 B2 * | 2/2014 | Swierczewski | B60N 2/06 297/216.1 |
| 8,733,840 B2 * | 5/2014 | Westerink | B60N 2/1625 297/342 X |
| 8,827,365 B2 * | 9/2014 | Gaither | B60N 2/242 297/342 |
| 8,857,911 B2 | 10/2014 | Aguirre et al. | |
| 9,656,583 B2 * | 5/2017 | Gaither | B60N 2/242 |
| 9,771,155 B2 * | 9/2017 | Zheng | B64D 11/0619 |
| 10,569,669 B2 * | 2/2020 | Dry | B60N 2/062 |
| 2011/0018316 A1 * | 1/2011 | Meredith | B60N 2/42736 297/216.1 |
| 2015/0284087 A1 * | 10/2015 | Henshaw | B64D 11/064 297/342 X |
| 2016/0159256 A1 * | 6/2016 | Szlag | B60N 2/065 297/341 |
| 2017/0129613 A1 * | 5/2017 | Cailleteau | A47B 91/08 |
| 2018/0194474 A1 * | 7/2018 | Jones | B64D 11/064 |
| 2019/0126780 A1 * | 5/2019 | Dry | B60N 2/0232 |
| 2019/0126786 A1 * | 5/2019 | Dry | B60N 2/01 |
| 2019/0308579 A1 * | 10/2019 | Jouper | G01G 19/12 |
| 2019/0329907 A1 * | 10/2019 | Benthien | F16C 11/0604 |

* cited by examiner

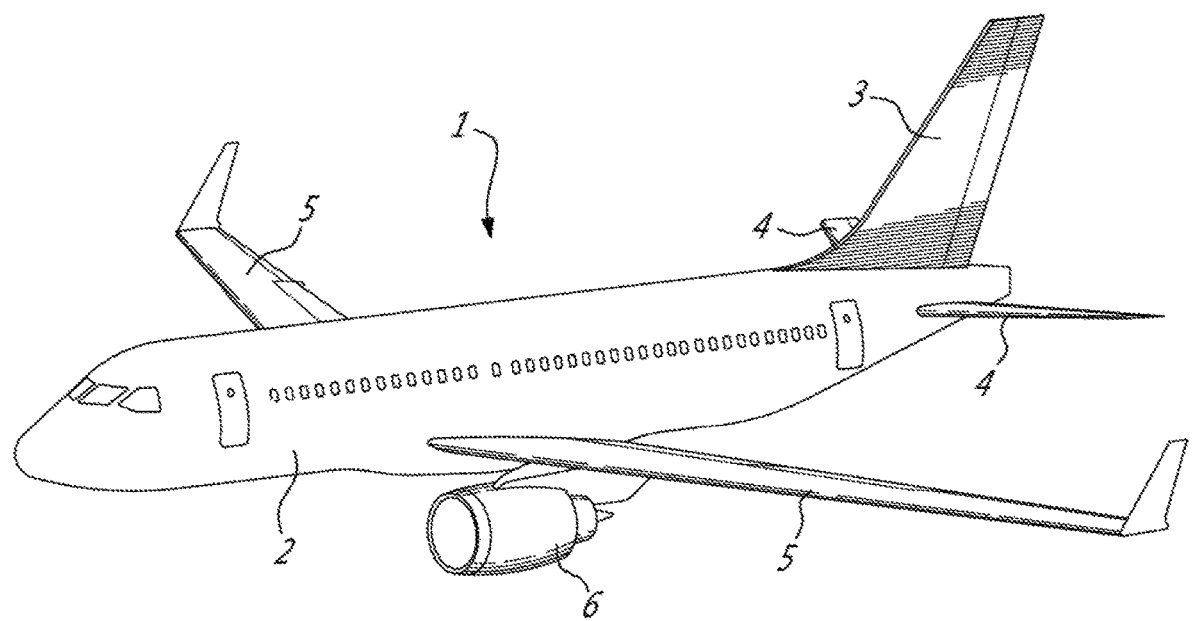

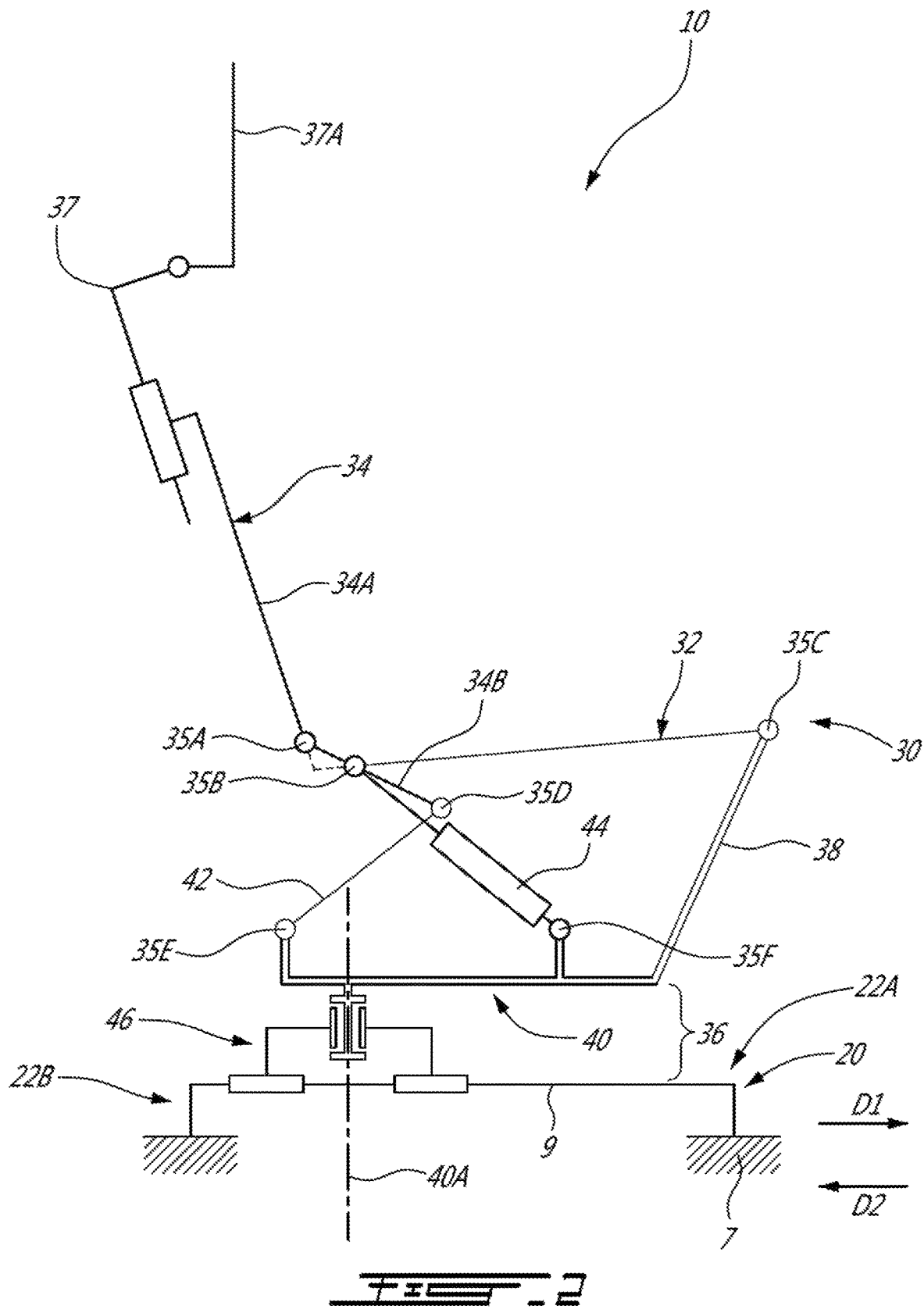

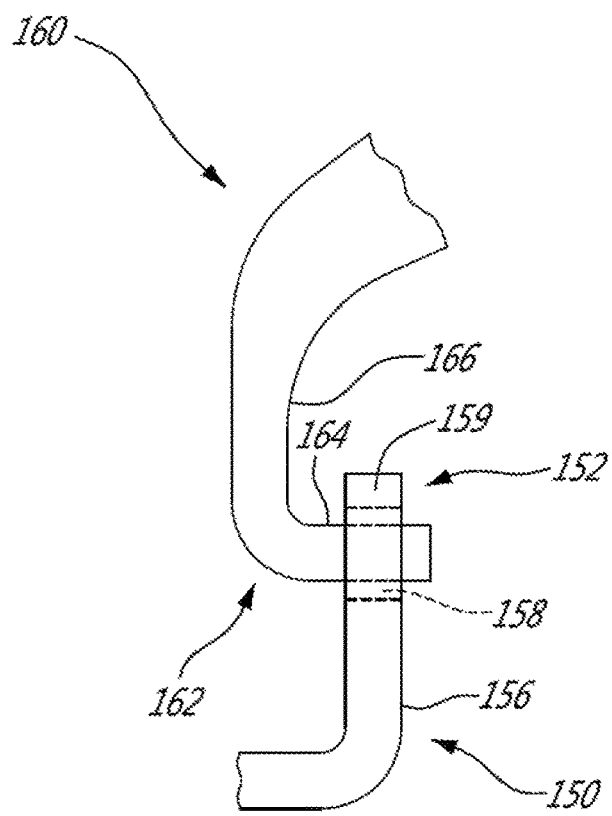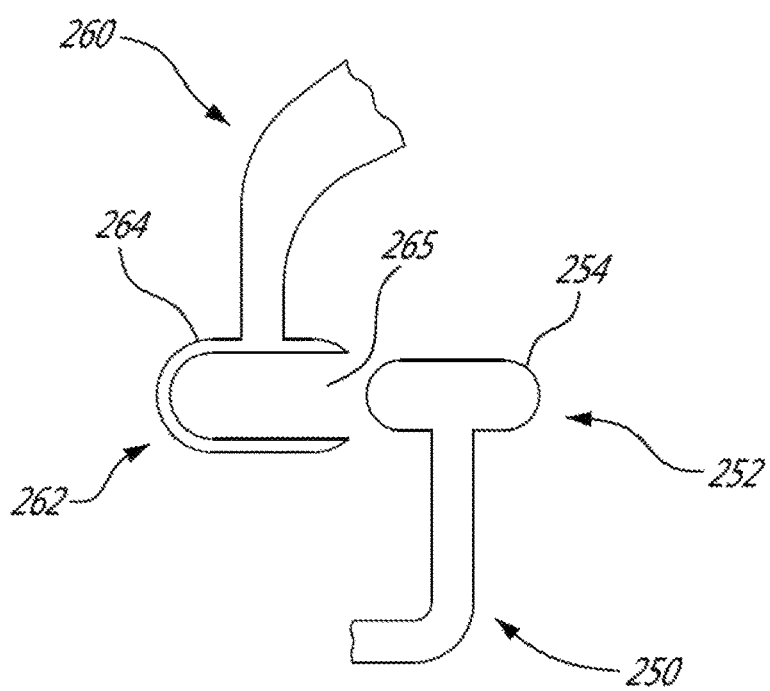

PASSENGER SEAT FOR AIRCRAFT

CROSS-REFERENCE TO RELATED APPLICATIONS

The present application claims priority to U.S. provisional patent application No. 62/639,202 filed on Mar. 6, 2018, the entire contents of which are incorporated by reference herein.

TECHNICAL FIELD

The application relates generally to seats for vehicles and, more particularly, to passenger seats for aircraft.

BACKGROUND

Aircraft seats must demonstrate sufficient stability during dynamic aircraft events, such as taxi, take-off and landing (TTOL), in order to satisfy passenger safety requirements. The architecture of some aircraft seats provides improved comfort for the passenger and better manoeuverability, but allows for high loading conditions when the aircraft experiences a dynamic aircraft event. For aircraft seats with these architectures, the devices normally used to stabilise and secure the aircraft seat during a dynamic aircraft event may not be sufficient to overcome the loading conditions caused by a severe aircraft dynamic event.

SUMMARY

In one aspect, there is provided a passenger seat for an aircraft, the seat comprising: a fixed seat portion configured to be connected to a floor of the aircraft to position a front of the fixed seat portion facing toward a first direction of the aircraft, the fixed seat portion having a centerline spaced equally from opposed lateral sides of the fixed seat portion, and a first engagement member extending upwardly from the front of the fixed seat portion at the centerline to a first engagement end; and a moveable seat portion mounted onto the fixed seat portion and being displaceable relative thereto, the moveable seat portion having a second engagement member extending downwardly from a front of the moveable seat portion to a second engagement end, the second engagement member being displaceable with the moveable seat portion to position the second engagement end under the first engagement end of the first engagement member in an engagement position such that the overlapping first and second engagement ends prevent the moveable seat portion from pitching in a second direction of the aircraft opposite to the first direction.

In an embodiment, the first engagement member is spaced apart from the second engagement member in the engagement position to define a gap between the first and second engagement members.

In an embodiment, at least one of the first and second engagement ends has a distal edge and at least one of the first and second engagement members has an upright segment with an engagement surface facing the distal edge and spaced apart therefrom in the engagement position, the distal edge defining a distal edge shape and the engagement surface having an engagement surface shape being complementary to the distal edge shape.

In an embodiment, the first engagement end has a first horizontal segment and the second engagement end has a second horizontal segment, the second horizontal segment being positioned under the first horizontal segment in the engagement position.

In an embodiment, the first and second engagement ends of the first and second engagement members have complementary female and male components.

In an embodiment, the first and second engagement ends of the first and second engagement members have complementary mushroom shapes.

In an embodiment, the first engagement member is fixedly attached to the fixed seat portion, and the second engagement member is fixedly attached to the moveable seat portion.

In an embodiment, the second engagement end is positioned under the first engagement end in the engagement position upon the moveable seat portion being in a forwardmost position relative to the aircraft.

In an embodiment, the moveable seat portion is displaceable relative to the fixed seat portion in the first and second directions, and in a yaw direction about an upright axis of the seat.

In an embodiment, the moveable seat portion includes a seat pan frame supporting a seat pan, and a support structure and moveable connection assembly interconnecting the seat pan frame to the fixed seat portion.

In another aspect, there is provided a method of positioning a passenger seat of an aircraft, the method comprising: displacing a moveable seat portion above and with respect to a fixed seat portion to engage a first engagement member of the fixed seat portion with a second engagement member of the moveable seat portion along a front of the fixed seat portion and a centre of the fixed seat portion, the front of the fixed seat portion facing toward a first direction of the aircraft, the first engagement member at least partially overlying the second engagement member to prevent the moveable seat portion from pitching in a second direction of the aircraft opposite to the first direction.

In an embodiment, displacing the moveable seat portion includes translating the moveable seat portion with respect to the fixed seat portion in the second direction of the aircraft to a forwardmost position of the moveable seat portion relative to the aircraft to at least partially overlie the second engagement member with the first engagement member.

In an embodiment, displacing the moveable seat portion includes translating the moveable seat portion in the first direction of the aircraft to disengage the first engagement member from the second engagement member.

In an embodiment, displacing the moveable seat portion includes rotating the moveable seat portion when in the forwardmost position to disengage the first engagement member from the second engagement member.

In an embodiment, the method further comprises arresting displacement of the moveable seat portion in a pitch direction with the first and second engagement members.

In an embodiment, arresting displacement of the moveable seat portion in the pitch direction includes permitting displacement of the moveable seat portion in the first direction of the aircraft, and a yaw direction about an upright axis of the seat.

DESCRIPTION OF THE DRAWINGS

Reference is now made to the accompanying figures in which:

FIG. 1 is a schematic tridimensional view of an aircraft;

FIG. 2 is a schematic diagram of the structure of a seat which can be used in an aircraft such as shown in FIG. 1, in accordance with an embodiment of the present disclosure;

FIG. 5 is a side view of first and second engagement members of an aircraft such as shown in FIG. 1, according to another embodiment of the present disclosure; and FIG. 6 is a side view of first and second engagement members of an aircraft such as shown in FIG. 1, according to yet another embodiment of the present disclosure.

DETAILED DESCRIPTION

Figure 3A:
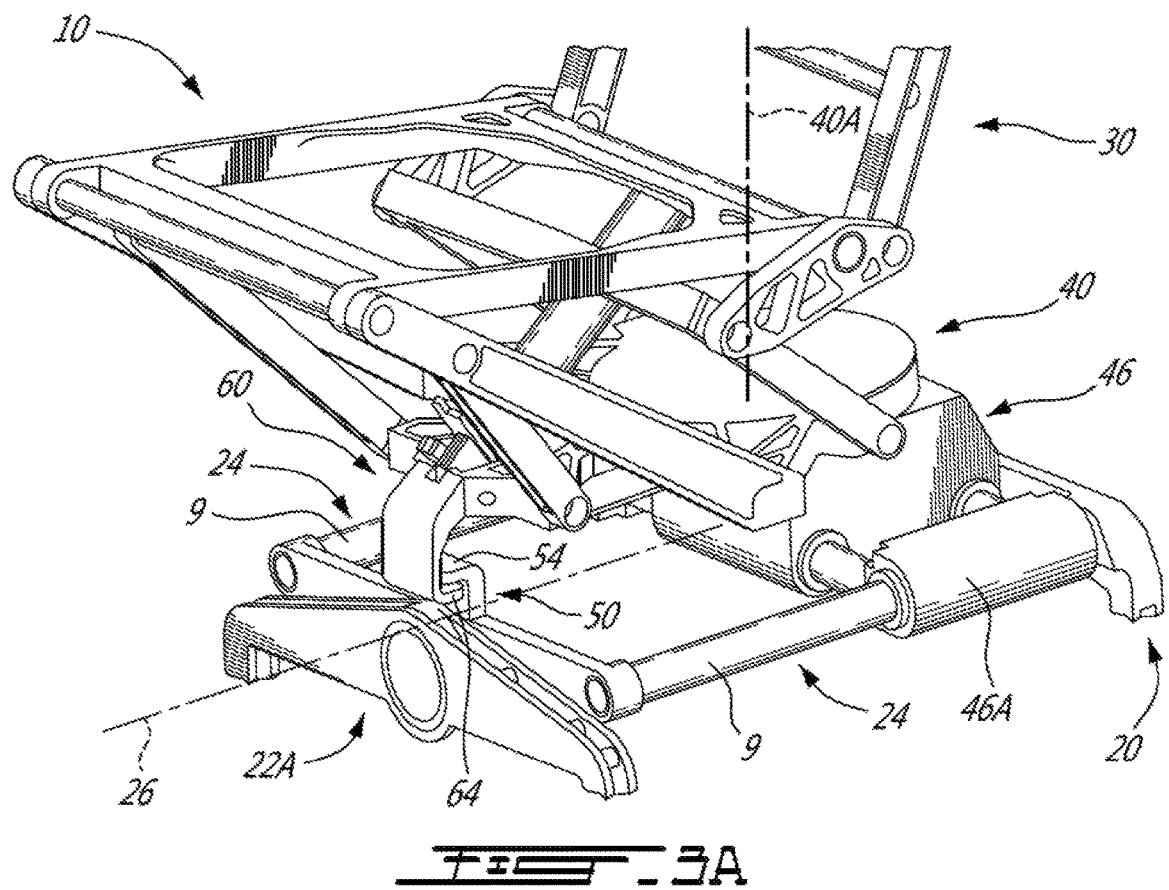
FIG. 3A is a schematic tridimensional view of the structure of the seat shown in FIG. 2.

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Referring to FIG. 2, a passenger seat 10 in accordance with an embodiment is shown. The passenger seat 10 is configured to be used, for example, in the cabin of an aircraft 1 such as shown in FIG. 1. The passenger seat 10 could alternately be used in any other suitable type of vehicle. The seat 10 is positioned to be oriented in a direction of the aircraft 1. More particularly, a front of the seat 10 is oriented to face in a first direction D1 of the aircraft 1. The first direction D1 of the aircraft 1 is toward a component at one of the end of the aircraft 1, such as the tail assembly at the rear end of the aircraft 1 or the cockpit at the front end of the aircraft 1. In the depicted embodiment, the first direction D1 of the aircraft 1 is an aft direction, such that the front of the seat 10 is oriented toward the aft end of the aircraft 1 which supports the tail assembly. A second direction D2 of the aircraft 1 is opposite to the first direction D1. Therefore, in the depicted embodiment, the second direction D2 is a forward direction, i.e. a direction toward the fore end of the aircraft 1 at which the cockpit is located.

The seat 10 is thus aft-facing in the depicted embodiment. The seat 10 is mounted to the fuselage 2 to position the seat 10 and its occupant facing in the aft, first direction D1 of the aircraft 1. It will therefore be appreciated that the first direction D1 is sometimes referred to herein as the "aft direction D1", and that the second direction D2 is sometimes referred to herein as the "forward direction D2". The seat 10 may have other orientations. In an alternate embodiment, the front end of the seat 10 is forward facing, such that the first direction D1 of the aircraft 1 is a forward direction toward the fore end of the aircraft 1 at which the cockpit is located, and the second direction D2 is an aft direction toward the aft end of the aircraft 1 which supports the tail assembly. It will also be appreciated that the orientation of the seat 10 may change, such that it is aft-facing in an initial position but displaceable to be forward-facing in a subsequent position, or vice versa.

The seat 10 includes a fixed seat portion 20, and a moveable seat portion 30 mounted onto the fixed seat portion 20 and displaceable relative thereto. The fixed seat portion 20 anchors the seat 10 to the aircraft 1, and is configured to be connected to a floor structure 7, for example to floor beams interconnected to the fuselage 2. In the embodiment shown, the fixed seat portion 20 includes rails 9 attached to the floor structure 7. The fixed seat portion 20 is fixed in position relative to the floor structure 7. The fixed seat portion 20 has a front end 22A facing toward the tail assembly, and a rear end 22B facing toward the cockpit. The fixed seat portion 20 has opposed lateral sides 24 between the front and rear ends 22A, 22B. A centerline 26 of the fixed seat portion 20, and of the seat 10, is defined between the lateral sides 24, and is spaced equally from the lateral sides 24 (see FIG. 3A). The expressions "front", "forward", "forwardly", "rear", "rearwardly" and other similar positional descriptors when used herein to define the relative location of a component of the seat 10 with respect to other components of the seat 10 refer to the direction of the seat 10 and not of the aircraft 1, where the surface of the seat 10 in contact with the occupant in the taxi, take-off and landing (TTOL) configuration of the seat 10 is considered to be the front of the seat 10, and where the surface of the seat 10 facing away from the occupant is considered to be the rear of the seat 10. It is however understood that depending on the orientation of the seat 10 within the aircraft 1, the front of the seat 10 may be facing toward a front, a rear, a side, etc. of the aircraft 1.

The seat 10 also includes a moveable seat portion 30 mounted to the fixed seat portion 20 and positioned above the fixed seat portion 20. The moveable seat portion 30 is displaceable with respect to the fixed seat portion 20. Different configurations of the moveable seat portion 30 are possible to achieve this functionality, and one possible configuration for the moveable seat portion 30 is now described with reference to FIG. 2.

The moveable seat portion 30 includes a seat pan frame 32 supporting a seat pan, and a backrest frame 34 supporting a backrest, and a moveable connection assembly 36 connected to the fixed seat portion 20, the seat pan frame 32 and backrest frame 36 connected to the movable connection assembly 36 via a suitable support structure further described below. The mounting of the seat pan frame 32 via the backrest frame 34 to the moveable connection assembly 36 allows the seat pan frame 32 to pivot from a neutral position and slide between a forwardmost position and a rearwardmost position, as described in greater detail below.

In a particular embodiment, the seat 10 corresponds to or is similar to the seat described in U.S. provisional application No. 62/608,717 filed Dec. 21, 2017, the entire contents of which are incorporated by reference herein. It is however understood that the configuration of the moveable connection assembly 36 shown here is exemplary only and that any other suitable type of moveable connection assembly 36 may alternately be used, including, but not limited to, supports including pivoting attachments, sliding attachments, and fixed attachments. It is also understood that the seat pan and backrest may include any material suitable for providing appropriate support and comfort to the occupant, including, but not limited to, suitable cushioning materials which will not be further described herein. The seat 10 is selectively configurable between a sitting configuration and a reclined configuration. In a particular embodiment, the sitting configuration corresponds to a TTOL configuration.

The backrest frame 34 has an upper backrest member 34A supporting the backrest, and a lower backrest member 34B extending downwardly from a bottom end of the upper backrest member 34A. In the embodiment shown, the upper and lower backrest members 34A, 34B are pivotally interconnected by a selectively lockable pivot connection 35A, e.g. a selectively lockable revolute joint. In the present disclosure, including claims, the term "revolute joint" is intended to designate a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint.

The pivot connection 35A between the upper and lower backrest members 34A, 34B has a locked configuration where a relative pivoting motion between the upper and lower backrest members 34A, 34B is prevented and an unlocked configuration where the relative pivoting motion between the upper and lower backrest members 34A, 34B is allowed. The pivot connection 35A may include, for example, a lock based on a spring-loaded plunger mechanism; any other suitable mechanism may alternately be used. In the embodiment shown, the upper and lower backrest members 34A, 34B are non-parallel when in the locked configuration. It is understood that in an alternate embodiment, the upper and lower backrest members 34A, 34B may be rigidly interconnected.

The rear end of the seat pan frame 32 is pivotally connected to the lower backrest member 34B by a pivot connection 35B, which in the embodiment shown is defined by another revolute joint.

Still referring to FIG. 2, the backrest also includes a headrest 37 which is slidingly engaged to a top of the upper backrest member 34A. The headrest 37 may include a pivotable portion 37A allowing for further adjustment of the position of the headrest 37. It is understood that the headrest configuration shown is exemplary only, and that any other suitable headrest configuration may alternately be used; alternately, the adjustable headrest may be omitted.

The support structure connecting the seat pan frame 32 and backrest frame 36 to the moveable connection assembly 36 includes a front support member 38 defining the frontmost portion (relative to the seat 10) of the support structure. The front support member 38 has a top end connected to the front end of the seat pan frame 32 via a pivot connection 35C, which in the embodiment shown is defined by a revolute joint. The front support member 38 has an opposed bottom end connected to a swivel assembly 40 of the moveable connection assembly 36. The swivel assembly 40 allows the seat pan frame 32 to rotate about an upright axis 40A of the seat 10. In the embodiment shown, the connection between the front support member 38 and the swivel assembly 40 is a rigid connection, i.e. allowing no relative motion between the swivel assembly 40 and the front support member 38.

The support structure connecting the seat pan frame 32 and backrest frame 36 to the moveable connection assembly 36 also includes a support arm 42 for connecting the backrest frame 34 to the swivel assembly 40. The support arm 42 has one end pivotally connected to the lower backrest member 34B by a pivot connection 35D defined at a location spaced from the upper backrest member 34A. In the embodiment shown, the pivot connection 35D between the support arm 42 and the lower backrest member 34B is defined by another revolute joint. A lower end of the support arm 42 is connected to the swivel assembly 40 via another pivot connection 35E, which in the embodiment shown is also defined as a fixed pivot or revolute joint. The pivot connection 35E between the support arm 42 and the swivel assembly 40 is located aft of the pivot connection 35C between the front end of the seat pan frame 32 and the front support member 38 and, in the embodiment shown, is located at the rear of the swivel assembly 40. The pivot connection 35C between the front end of the seat pan frame 32 and the front support member 38 is upwardly offset with respect to the pivot connection 35E between the support arm 42 and the swivel assembly 40.

Still referring to FIG. 2, the support structure connecting the seat pan frame 32 and backrest frame 36 to the moveable connection assembly 36 also includes a biasing and/or damping member, for example a gas spring 44 or any suitable type of linear actuator located under the seat pan frame 32. In a particular embodiment, having the gas spring 44 located under the seat pan frame 32 as opposed to behind the backrest frame 34 allows for the backrest to have a reduced thickness, which may provide increased free space for the occupant(s) of the adjacent seat(s).

In the embodiment shown, the gas spring 44 has one end pivotally connected to the lower backrest member 34B and to the rear end of the seat pan frame 32 at the pivot connection 35B between the lower backrest member 34B and the rear end of the seat pan frame 32. The opposed end of the gas spring 44 is pivotally connected to the swivel assembly 40 by a pivot connection 35F, which in the embodiment shown is also defined as a fixed pivot or revolute joint. The pivot connection 35F between the gas spring 44 and the swivel assembly 40 is located between the pivot connections 35C, 35E of the swivel assembly 40 with the front end of the seat pan frame 32 and with the support arm 42.

In the embodiment shown, the gas spring 44 is connected toward the front of the swivel assembly 40, so that its connection with the swivel assembly 40 remains forward of its connection with the lower backrest member 34B and seat pan frame 32 throughout the motion of the backrest frame 34 and the seat pan frame 32 between the sitting and reclined configurations. The pivot connections 35D, 35B of the lower backrest member 34B remain aft of the pivot connection 35F between the gas spring 44 and the swivel assembly 40 as the backrest frame 34 and seat pan frame 32 move between the sitting configuration and the reclined configuration.

Still referring to FIG. 2, the moveable connection assembly 36 also includes a sliding assembly 46. A bottom of the swivel assembly 40 is mounted to the sliding assembly 46. The sliding assembly 46 is mounted to the rails 9 of the fixed seat portion 20 to connect the moveable connection assembly 36 to the fixed seat portion 20. The sliding assembly 46 allows the seat pan frame 32, and thus the moveable seat portion 30, to slide along the rails 9 and thereby translate in the aft and forward directions D1, D2 of the aircraft 1.

The architecture of the aft-facing seat 10 shown in FIG. 2 supports the swivel assembly 40 near the rear of the seat 10. The connection between the swivel and sliding assemblies 40, 46, which is defined in proximity to the swivel axis 40A, is aligned with a rear portion of the seat pan frame 32. Consequently, if a dynamic aircraft event during TTOL causes the seat 10 and its occupant to pitch in the forward direction D2 of the aircraft 1, i.e. in a direction pushing the backrest frame 34 toward the rear of the seat 10 and the front end of the seat pan frame 32 upwardly, the forces caused by the weight of the occupant pushing against the backrest frame 34, and the moment created by that force transmitted via the front support member 38 and the movable connection assembly 36, may be sufficiently large to damage the connection between the swivel and sliding assemblies 40, 46.

Figure 3B:
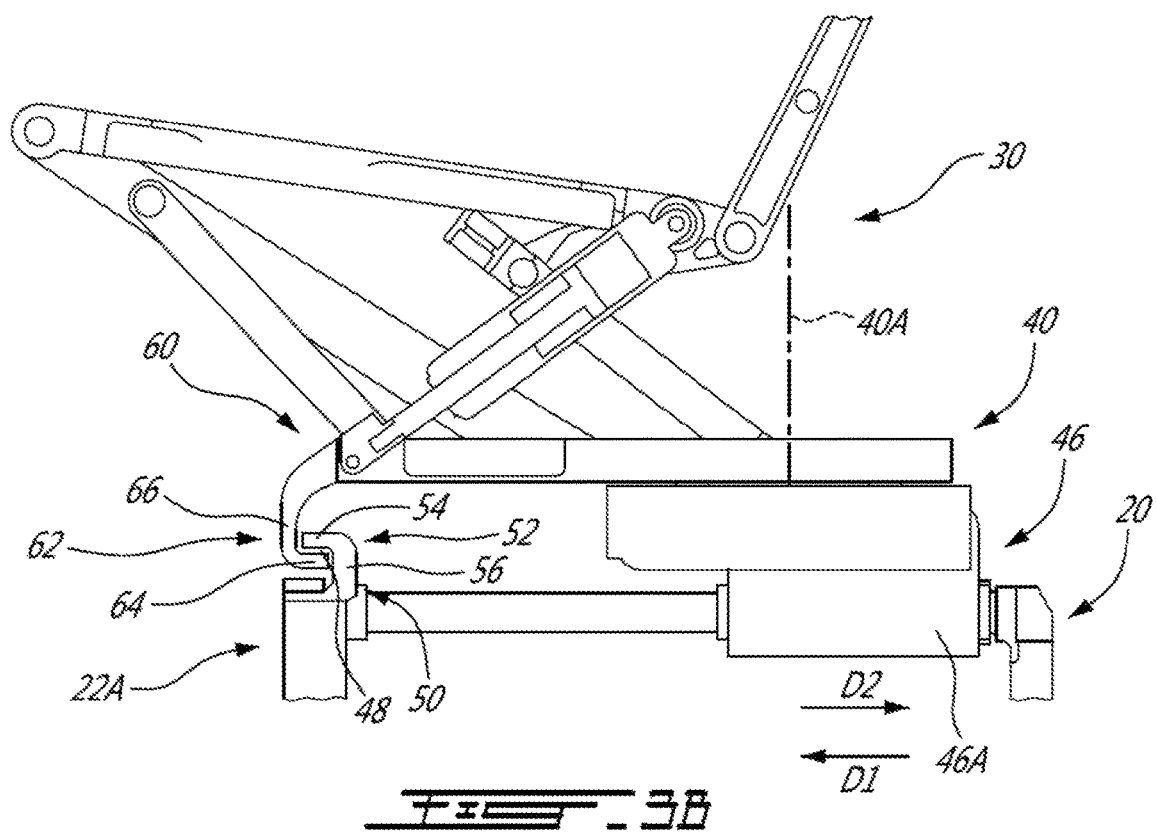
FIG. 3B is a schematic side cross-sectional view of the structure of the seat shown in FIG. 2.

To better counteract the moment generated during the dynamic aircraft event, the connection between the fixed and moveable seat portions 20, 30 is reinforced with engagement members. Referring to FIGS. 3A and 3B, the fixed seat portion 20 has a first engagement member 50 and the moveable seat portion 30 has a second engagement member 60, both of which are now described in greater detail. The first and second engagement members 50, 60 may be made of any suitable material, such as metal. The first engagement member 50 is fixedly attached to the fixed seat portion 20, and the second engagement member 60 is fixedly attached to the moveable seat portion 30.

The first engagement member 50 extends upwardly from the front end 22A of the fixed seat portion 20 at the centerline 26. The first engagement member 50 terminates at an upper first engagement end 52. The first engagement member 50 is fixed in position because it is mounted to the fixed set portion 20. The second engagement member 60 extends downwardly from the front of the moveable seat portion 30 to a second engagement end 62 at a lower, distal end of the second engagement member 60. The second engagement member 60 and the second engagement end 62 are displaceable with the moveable seat portion 30. In the depicted embodiment, the second engagement member 60 is mounted to the front of the swivel assembly 40. In the depicted embodiment, the second engagement member 60 is displaceable in the aft and forward directions D1, D2, and in a swivel or yaw direction about the upright axis 40A, together with the movable seat portion 30.

When the first and second engagement members 50, 60 are engaged to reinforce the connection between the fixed and moveable seat portions 20, 30 during a dynamic aircraft event, as shown in FIGS. 3A and 3B, the second engagement end 62 of the movable seat portion engagement member 60 is positioned underneath the first engagement end 52 of the fixed seat portion engagement member 50. In this engagement position, the first engagement end 52 overlaps or overlies the second engagement end 62. In this engagement position, the moveable seat portion 30 is prevented from pitching in the forward direction D2 of the aircraft 1 during a dynamic aircraft event, because the second engagement end 62 would abut against the first engagement end 52 such that the first engagement end 52 would block further pitch displacement of the second engagement end 62.

It will therefore be appreciated that the first and second engagement members 50, 60 act to reinforce the connection between the fixed and moveable seat portions 20, 30 during a dynamic aircraft event, separately and independently of other devices (e.g. brakes, pins in holes, etc.) that are used to arrest movement of the moveable seat portion 30 relative to the fixed seat portion 20 in normal flight conditions. In the seat 10 shown in FIGS. 3A and 3B, the first and second engagement members 50, 60 help to offload at least some of moment acting on the connection between the swivel and sliding assemblies 40, 46 during a dynamic aircraft event when the seat 10 is in the TTOL position, thereby helping to reduce the likelihood of a failure in either one of these components.

The first and second engagement members 50, 60 may have any suitable shape to achieve the above-described functionality. In the depicted embodiment, the first and second engagement members 50, 60 have complementary hook shapes. The first engagement end 52 of the fixed seat portion engagement member 50 has a first horizontal segment 54 which extends away from a first upright segment 56 of the first engagement member 50 in the aft direction D1 of the aircraft 1. The second engagement end 62 of the movable seat portion engagement member 60 has a second horizontal segment 64 which extends away from a second upright segment 66 of the second engagement member 60 in the forward direction D2 of the aircraft 1. The second horizontal segment 64 is positioned underneath the first horizontal segment 54 in the engagement position.

Another possible shape for the first and second engagement members 150, 160 is shown in FIG. 5. The first and second engagement members 150, 160 form complementary engageable female and male components. The first upright segment 156 of the first engagement member 150 of the fixed seat portion has an opening 158 delimited by a support ridge 159 above the opening 158 at the first engagement end 152. In the depicted embodiment, the first engagement member 150 does not have a transverse or horizontal component. The second upright segment 166 is fixedly attached to a component of the moveable seat portion 30 and does not move with respect to the moveable seat portion 30. The second horizontal segment 164 of the second engagement end 162 of the movable seat portion engagement member 160 extends away from the second upright segment 166 in the forward direction D2 of the aircraft 1. To place the first and second engagement members 150, 160 in the engagement position, the second horizontal segment 164 is positioned through the opening 158 and underneath the support ridge 159. Displacing the moveable seat portion 30 by translating it in the aft direction D1 of the aircraft 1 with respect to the fixed seat portion 20 will disengage the first and second engagement members 150, 160 from the engagement position.

Yet another possible shape for the first and second engagement members 250, 260 is shown in FIG. 6. The first and second engagement ends 252, 262 have complementary "mushroom" shapes, for example similar to a hitch engagement for a road vehicle. More particularly, the second engagement end 262 of the movable seat portion engagement member 260 has a mushroom-shaped cap 264 defining an internal cavity, and an opening 265 in a side of the cap 264. The first engagement end 252 of the fixed seat portion engagement member 250 has a mushroom-shaped protrusion 254. To place the first and second engagement members 250, 260 in the engagement position, the cap 264 is displaced toward the protrusion 254 such that the protrusion 254 slides through the opening 265 in the cap 264 and fits within the cavity of the cap 264.

It will therefore be appreciated that the present disclosure includes many possible shapes for the first and second engagement members 50, 60, 150, 160, 250, 260 which allow them to engage one another at the front and center of the seat 10 to prevent the seat 10 from pitching in the forward direction D2 of the aircraft 1 during a dynamic aircraft event. In yet another embodiment, the first and second engagement members 50, 60, 150, 160, 250, 260 are positioned in the engagement position using interlocking components or mechanical devices.

Returning to FIGS. 3A and 3B, the first and second engagement members 50, 60 are spaced apart from one another when in the engagement position. This allows the moveable seat portion 30 to be displaced relative to the fixed seat portion 20 to place the first and second engagement members 50, 60 in the engagement position, and to disengage the first and second engagement members 50, 60 out of the engagement position. As best seen in FIG. 3B, a gap 48 is defined between the first and second engagement members 50, 60. The gap 48 has a vertical dimension between the overlapping first and second engagement ends 52, 62, and a horizontal dimension. The movement of the movable seat portion 30 of the aft-facing seat 10 will now be described relative to the aircraft directions. Accordingly, it is understood that the forward direction D2 of the aircraft 1 corresponds to the aft direction relative to the seat structure, and that the aft direction D1 of the aircraft 1 corresponds to the forward direction relative to the seat structure.

To place the first and second engagement members 50, 60 in the engagement position, the moveable seat portion 30 may be slid or translated in the forward direction D2 of the aircraft 1 to place the aft-facing seat 10 it its forwardmost position relative to the aircraft. This movement of the moveable seat portion 30 positions the second engagement end 62 of the movable seat portion engagement member 60 under the first engagement end 52 of the fixed seat portion engagement member 50 in the engagement position. This is shown in FIGS. 3A and 3B, where a displacement mechanism 46A of the sliding assembly 46 is positioned on the rails 9 at its forwardmost position relative to the aircraft. In this position, the seat 10 cannot translate further during a dynamic aircraft event. In the depicted embodiment, moving the seat 10 forwards relative to the aircraft 1 will automatically place the first and second engagement members 50, 60 in the engagement position.

Similarly, displacing the moveable seat portion 30 in the aft direction D1 of the aircraft 1 will disengage the first and second engagement members 50, 60 from the engagement position. In FIGS. 3A and 3B, causing the displacement mechanism 46A of the sliding assembly 46 to slide along the rails 9 of the fixed seat portion 20 in the aft direction D1 of the aircraft 1 will move the second engagement end 62 away from overlapping the first engagement end 52, and thereby disengage the first engagement member 50 from the second engagement member 60. Therefore, in the depicted embodiment, no manual manipulation of the first and second engagement members 50, 60 is required to disengage them.

Figure 4A:
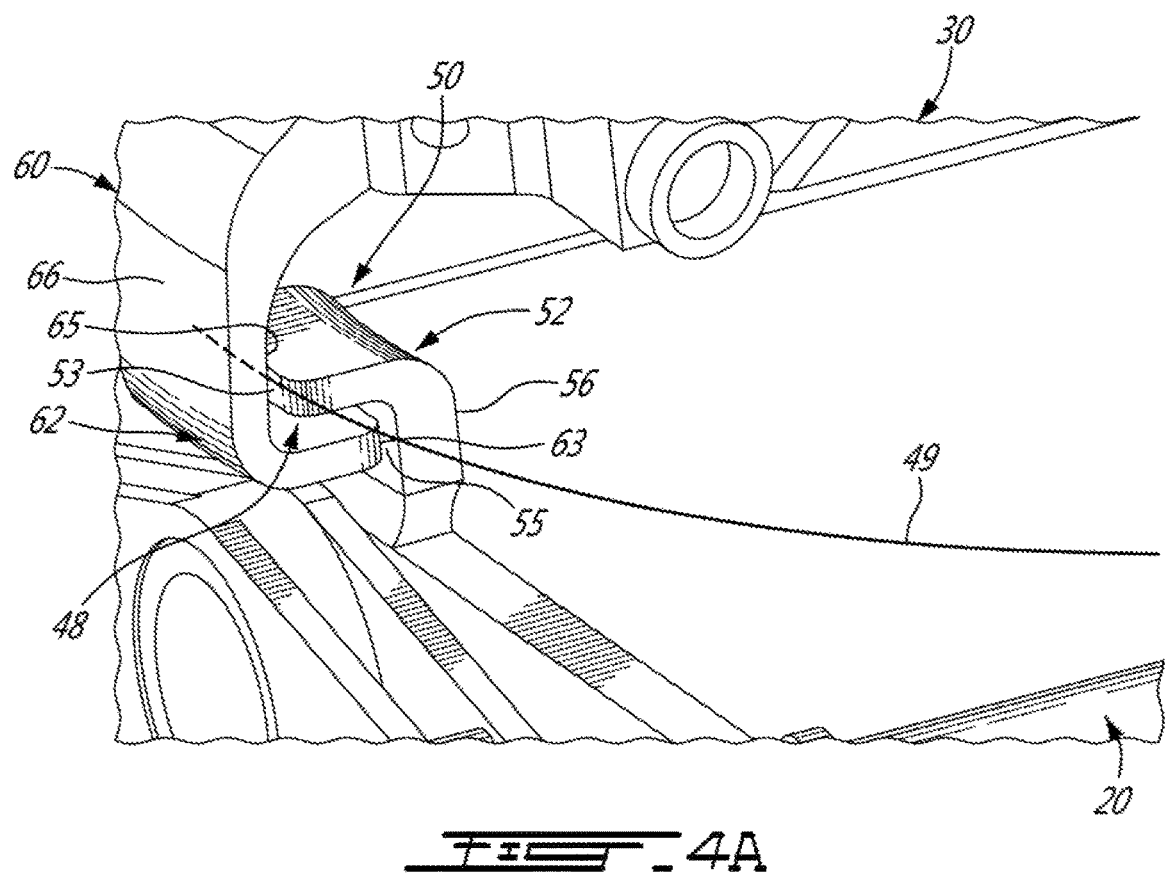
FIG. 4A is a schematic tridimensional view of first and second engagement members of the seat shown in FIG. 3A.
Figure 4B:
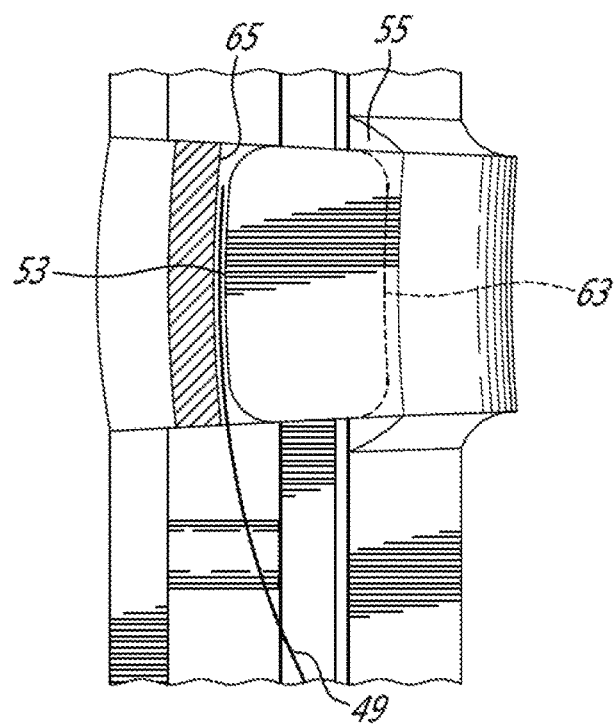
FIG. 4B is a top view of the first and second engagement members of FIG. 4A.

The first and second engagement members 50, 60 can also be disengaged from each other by rotating or swiveling the moveable seat portion 30 about the upright axis 40A. Referring to FIGS. 4A and 4B, in a particular embodiment both the first and second engagement ends 52, 62 have a distal edge 53, 63. The distal edge 53 of the first engagement end 52 faces the second upright segment 66 of the second engagement member 60, and the distal edge 63 of the second engagement end 62 faces the first upright segment 56 of the first engagement member 50. Each of the first and second upright segments 56, 66 defines an engagement surface 55, 65 which faces a corresponding distal edge 53, 63 and is spaced apart therefrom across the gap 48 in the engagement position. The distal edges 53, 63 defining a distal edge shape that is similar to a shape of the engagement surfaces 55, 65 (see FIG. 4B). In the depicted embodiment, the distal edge and engagement surface shapes are curves, such that the curvature of the distal edges 53, 63 is complementary to the curvature of the engagement surfaces 55, 65. The moveable seat portion 30 may therefore be swiveled about the upright axis 40 along a swivel arc 49 without contacting the first and second engagement members 50, 60 with each other. To disengage the first and second engagement members 50, 60, the occupant can use the swivel assembly 40 to rotate the moveable seat portion 30 about the upright axis 40A, which will move the second engagement end 62 from its overlapping position above the first engagement end 52, and thereby disengage the first engagement member 50 from the second engagement member 60. The occupant is able to swivel the seat 10 to disengage from the engagement position even when the seat 10 is in its rearwardmost position.

Alternately, the distal edges 53, 63 and engagement surfaces 55, 65 may have any other suitable shape, including, but not limited to, a straight shape.

It will therefore be appreciated that the first and second engagement members 50, 60 do not prevent or block all movement of the moveable seat portion 30 relative to the fixed seat portion 20. Indeed, when in the engagement position, the first and second engagement members 50, 60 permit displacement of the moveable seat portion 30 in the aft direction D1 of the aircraft 1, and a yaw or swivel direction about the upright axis 40A. The first and second engagement members 50, 60 only come in contact with each other in the case of an accidental forward pitching moment of the moveable seat portion 30, and act to arrest displacement of the moveable seat portion 30 only in the pitch direction when in the engagement position, thereby allowing the seat 10 and its occupant to preserve most of the mobility of the seat 10.

Referring to FIG. 3A and 3B, there is also disclosed a method of positioning the aft-facing passenger seat 10. The method includes: displacing the moveable seat portion 30 above and with respect to the fixed seat portion 20 to engage the first engagement member 50 with the second engagement member 60 along a front 22A of the fixed seat portion 20 a centre of the fixed seat portion 20. The first engagement member 50 at least partially overlies the second engagement member 60 to prevent the moveable seat portion 30 from pitching in the forward direction D2 of the aircraft 1.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A passenger seat for an aircraft, the seat comprising:
   a fixed seat portion configured to be connected to a floor of the aircraft to position a front of the fixed seat portion facing toward a first direction of the aircraft, the fixed seat portion having a centerline spaced equally from opposed lateral sides of the fixed seat portion, and a first engagement member extending upwardly from the front of the fixed seat portion at the centerline to a first engagement end; and
   a moveable seat portion mounted onto the fixed seat portion and being displaceable relative thereto in the first direction of the aircraft, in a second direction of the aircraft opposite to the first direction, and in a yaw direction about an upright axis of the seat, the moveable seat portion having a second engagement member extending downwardly from a front of the moveable seat portion to a second engagement end, the second engagement member being displaceable with the moveable seat portion to position the second engagement end under the first engagement end of the first engagement member in an engagement position such that the overlapping first and second engagement ends prevent the moveable seat portion from pitching in the second direction of the aircraft.

2. The passenger seat as defined in claim 1, wherein the first engagement member is spaced apart from the second engagement member in the engagement position to define a gap between the first and second engagement members.

3. The passenger seat as defined in claim 1, wherein at least one of the first and second engagement ends has a distal edge and at least one of the first and second engagement members has an upright segment with an engagement surface facing the distal edge and spaced apart therefrom in the engagement position, the distal edge defining a distal edge shape and the engagement surface having an engagement surface shape being complementary to the distal edge shape.

4. The passenger seat as defined in claim 3, wherein the distal edge shape and the engagement surface shape are curved.

5. The passenger seat as defined in claim 1, wherein the first engagement end has a first horizontal segment and the second engagement end has a second horizontal segment, the second horizontal segment being positioned under the first horizontal segment in the engagement position.

6. The passenger seat as defined in claim 1, wherein the first and second engagement ends of the first and second engagement members have complementary female and male components.

7. The passenger seat as defined in claim 1, wherein the first and second engagement ends of the first and second engagement members have complementary mushroom shapes.

8. The passenger seat as defined in claim 1, wherein the first engagement member is fixedly attached to the fixed seat portion, and the second engagement member is fixedly attached to the moveable seat portion.

9. The passenger seat as defined in claim 1, wherein the second engagement end is positioned under the first engagement end in the engagement position upon the moveable seat portion being in a forwardmost position relative to the aircraft.

10. The passenger seat as defined in claim 1, wherein the moveable seat portion includes a seat pan frame supporting a seat pan, and a support structure and moveable connection assembly interconnecting the seat pan frame to the fixed seat portion.

11. A method of positioning a passenger seat of an aircraft, the method comprising: displacing a moveable seat portion above and with respect to a fixed seat portion to engage a first engagement member of the fixed seat portion with a second engagement member of the moveable seat portion along a front of the fixed seat portion and a centre of the fixed seat portion, the front of the fixed seat portion facing toward a first direction of the aircraft, the first engagement member at least partially overlying the second engagement member to prevent the moveable seat portion from pitching in a second direction of the aircraft opposite to the first direction, and rotating the moveable seat portion about an upright axis of the seat to disengage the first engagement member from the second engagement member.

12. The method as defined in claim 11, wherein displacing the moveable seat portion includes translating the moveable seat portion with respect to the fixed seat portion in the second direction of the aircraft to a forwardmost position of the moveable seat portion relative to the aircraft to at least partially overlie the second engagement member with the first engagement member.

13. The method as defined in claim 12, wherein displacing the moveable seat portion includes translating the moveable seat portion in the first direction of the aircraft to disengage the first engagement member from the second engagement member.

14. The method as defined in claim 12, wherein rotating the moveable seat portion includes rotating the moveable seat portion when in the forwardmost position to disengage the first engagement member from the second engagement member.

15. The method as defined in claim 11, further comprising arresting displacement of the moveable seat portion in a pitch direction with the first and second engagement members.

16. The method as defined in claim 15, wherein arresting displacement of the moveable seat portion in the pitch direction includes permitting displacement of the moveable seat portion in the first direction of the aircraft, and a yaw direction about the upright axis of the seat.

17. The method as defined in claim 11, comprising arresting displacement of the moveable seat portion in the second direction of the aircraft.

18. The method as defined in claim 11, wherein displacing and rotating the moveable seat portion is done without manual manipulation of the first and second engagement members.

19. The passenger seat as defined in claim 1, wherein the second engagement member is displaceable in the yaw direction about the upright axis of the seat to position the second engagement end spaced apart from the first engagement end of the first engagement member in a disengaged position such that the moveable seat portion is free to pitch in the second direction of the aircraft.

20. The passenger seat as defined in claim 1, wherein the second engagement member is displaceable in the first direction of the aircraft with the moveable seat portion to position the second engagement end spaced apart from the first engagement end of the first engagement member in a disengaged position such that the moveable seat portion is free to pitch in the second direction of the aircraft.

* * * * *